(12) United States Patent
Patel et al.

(10) Patent No.: US 11,667,371 B2
(45) Date of Patent: Jun. 6, 2023

(54) COMPOSITE MATERIALS HAVING REINFORCED ACCESS OPENINGS

(71) Applicant: The Boeing Company, Chicago, IL (US)

(72) Inventors: Avnishkumar A. Patel, Mukilteo, WA (US); Lyle Ray Deobald, Shoreline, WA (US); Clinton L. Johnson, Sammamish, WA (US); Satya S. Vangala, Lake Stevens, WA (US)

(73) Assignee: THE BOEING COMPANY, Arlington, VA (US)

( * ) Notice: Subject to any disclaimer, the term of this patent is extended or adjusted under 35 U.S.C. 154(b) by 148 days.

(21) Appl. No.: 16/839,868

(22) Filed: Apr. 3, 2020

(65) Prior Publication Data

US 2021/0309344 A1 Oct. 7, 2021

(51) Int. Cl.
*B64C 3/20* (2006.01)
*B29B 11/16* (2006.01)
*B29D 99/00* (2010.01)
B29C 70/46 (2006.01)
B29L 31/30 (2006.01)

(52) U.S. Cl.
CPC .............. *B64C 3/20* (2013.01); *B29B 11/16* (2013.01); *B29D 99/0014* (2013.01); *B29D 99/0028* (2013.01); *B29C 70/462* (2013.01); *B29L 2031/3085* (2013.01)

(58) Field of Classification Search
CPC ....... B64C 3/20; B29B 11/16; B29D 99/0014; B29D 99/0028; B29C 70/462; B29C 70/34; B29C 70/887; B29C 70/06; B29L 2031/3085; Y02T 50/40
See application file for complete search history.

(56) References Cited

U.S. PATENT DOCUMENTS

| 2012/0052247 A1 | 3/2012 | Pook et al. |
| 2012/0119031 A1 | 5/2012 | Ainsworth |
| 2013/0236692 A1 | 9/2013 | Tanaka et al. |
| 2019/0389096 A1* | 12/2019 | Shimizu .................... B32B 3/06 |

FOREIGN PATENT DOCUMENTS

| EP | 3569402 A1 | 11/2019 | |
| JP | 2002361666 A | 12/2002 | |
| WO | WO-2018154846 A1 * | 8/2018 | ............. B32B 15/02 |

* cited by examiner

*Primary Examiner* — Brian Handville
(74) *Attorney, Agent, or Firm* — Coats & Bennett, PLLC

(57) ABSTRACT

Structurally reinforced composite components are disclosed having access openings reinforced to increase strain load and buckling load without adding weight to the composite components by inducing out-of-plane regions proximate to the access opening during composite prepreg laminate layup.

20 Claims, 12 Drawing Sheets

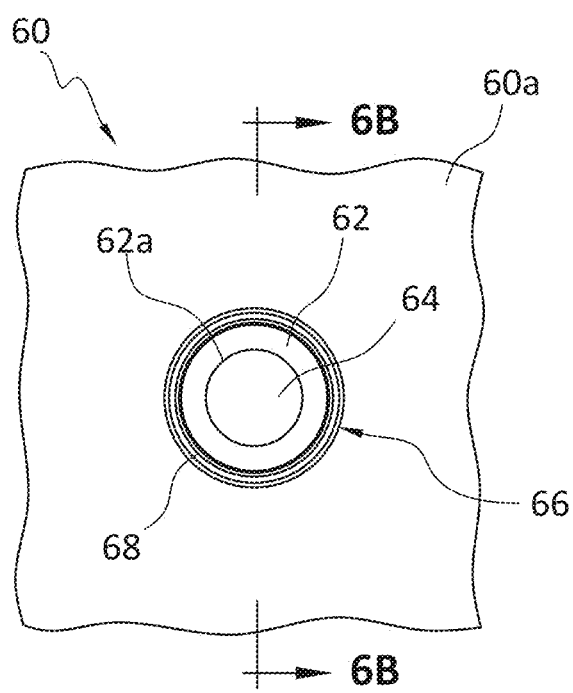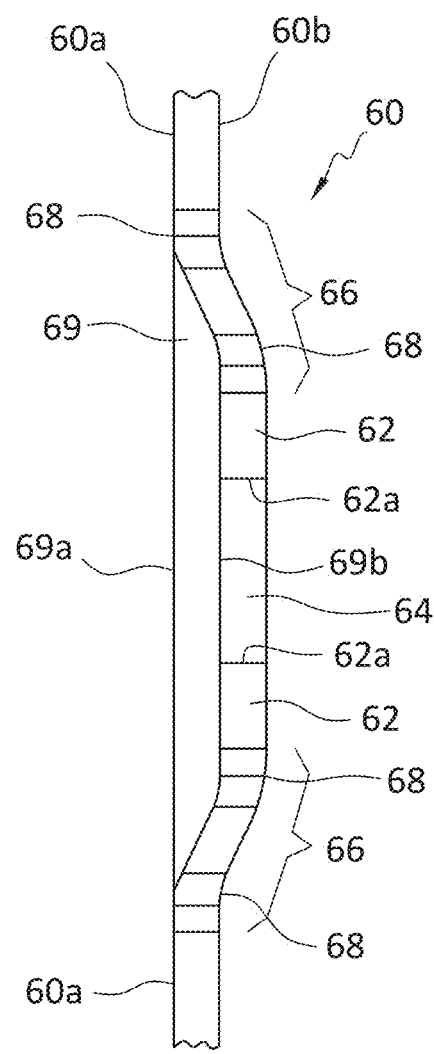
FIG. 6A
FIG. 6B

COMPOSITE MATERIALS HAVING REINFORCED ACCESS OPENINGS

TECHNOLOGICAL FIELD

The present disclosure relates generally to the field of structural reinforcement. More specifically the present disclosure relates to the field of reinforcing composite component structures by reducing peak strain at locations of large composite component structures.

BACKGROUND

Isolated locations of components on large structure can incur peak strain variations during use. At such locations, that can include joints and apertures, prolonged exposure to certain peak strain levels can lead to material fatigue. In the case of composite materials made from layers of layed-up materials (e.g., cured epoxy resin impregnated layers, or "prepregs", etc.), excessive peak strain exhibited at certain locations, and over, for example, sustained and predetermined durations can cause deformation of a structure, delamination of a structural component, or other conditions that evidence undesirable material fatigue. Such material fatigue can adversely impact the expected performance of such materials, and further lead to premature rework of structures, structural components, assemblies and sub-assemblies that comprise such structures and structural components.

Reinforcing composite component areas that endure enhanced material strain forces have required a localized, or "regional" build-up of additional material that significantly increases manufacturing complexity and significantly increases overall weight of the composite component due to the total material increase in creating the localized build-up of material to reinforce composite components against peak strain, and otherwise impacts overall structural design of a composite component.

SUMMARY

According to present aspects, a method is disclosed for reinforcing a composite component by imparting (referred to equivalently herein as "inducing") reinforcing features to the composite component, with the method including laying up a plurality of prepreg plies on a layup tool to form a composite component laminate, with the layup tool including a planar region (referred to equivalently herein as "planar section", "in-plane region", and "in-plane section") on the tool and at least one out-of-plane feature on the tool. The method further includes imparting a non-planar region (referred to equivalently herein as "non-planar section", "out-of-plane region", and "out-of-plane section") to the composite component laminate and curing the composite laminate material to form a cured composite component, with the cured composite component including a planar region adjacent to an access opening, with the access opening extending through the composite component, and with the planar region comprising a first thickness. The cured composite laminate further includes an induced out-of-plane reinforcing region, said induced out-of-plane reinforcement region (referred to equivalently herein as an "induced non-planar reinforcement region") located a predetermined distance from the access opening, and with the induced reinforcement region including an out-of-plane geometric perimeter (referred to equivalently herein as a "non-planar geometric perimeter"), said out-of-plane geometric perimeter surrounding the access opening, and with the out-of-plane geometric perimeter comprising a second thickness, and wherein the first thickness and the second thickness are substantially equivalent.

In another aspect, the number of prepreg plies applied to the planar region on the tool is equivalent to the number of prepreg plies applied to the out-of-plane feature on the tool.

In a further aspect, the composite material is a thermoplastic polymeric material.

In another aspect, the composite material is a thermoset polymeric material.

According to present aspects, a method is disclosed for reinforcing a composite component by imparting reinforcing features to the composite component, with the method including manufacturing a composite component comprising an access opening, with the composite component including a planar region proximate to the access opening and an induced out-of-plane reinforcing region, with the induced out-of-plane reinforcing region located a predetermined distance from the access opening, and with the induced reinforcement region comprising an out-of-plane geometric perimeter, with the out-of-plane geometric perimeter surrounding the access opening at a predetermined distance from the access opening.

In another aspect, the induced out-of-plane reinforcing region alters the strain pattern to a predetermined degree through the composite component.

In a further aspect, the composite material comprises at least one of: a thermoplastic polymeric material and a thermoset polymeric material.

Further aspects are directed to a component with the component including a composite component, and with the composite component including a planar region adjacent to and substantially surrounding an access opening, with the access opening extending through the composite component, and with the planar region comprising a first thickness. The component further includes an induced reinforcing region, said induced reinforcing region located a predetermined distance from the access opening, and said induced reinforcing region comprising a geometric perimeter, with the geometric perimeter surrounding the access opening, with the geometric perimeter comprising a second thickness, and wherein the first thickness and the second thickness are substantially equivalent.

In another aspect, the induced reinforcing region comprises a reinforcing segment that is out-of-plane as compared to the planar region.

In another aspect, the induced reinforcing region increases the buckling load of the component by about 45% as compared to a component without the induced reinforcing region.

In a further aspect, the induced reinforcing region increases the out-of-plane stiffness of the component.

In another aspect, the induced reinforcing region counteracts buckling forces sustained by the component during use of the component.

In another aspect, the induced reinforcing region increases the damage arrest capability of the component during use of the component.

In another aspect, the induced reinforcing region alters an in-plane strain pattern to a predetermined degree across the component.

In a further aspect, the induced reinforcing region decreases peak strain in the composite component in the reinforcement region by about 25% as compared to a component without the induced reinforcing component.

In another aspect, the component is dimensioned to mate with an external cover, and wherein said cover in combination with the component preserves an outer mold line.

In another aspect, the composite material comprises a predetermined number of cured prepregs.

In another aspect, the substantially planar region and the induced reinforcing region comprise an equivalent number of cured prepregs.

A further aspect is directed to a structure including a composite component, with the composite component including a planar region adjacent to and substantially surrounding an access opening, with the access opening extending through the composite component, and with the planar region comprising a first thickness. The component further includes an induced reinforcing region, said induced reinforcement region located a predetermined distance from the access opening, and said induced reinforcement region comprising a geometric perimeter, with the geometric perimeter surrounding the access opening, with the geometric perimeter comprising a second thickness, and wherein the first thickness and the second thickness are substantially equivalent.

In another aspect, the structure includes at least one of a manned aircraft, an unmanned aircraft, a manned spacecraft, an unmanned spacecraft, a manned rotorcraft, an unmanned rotorcraft, a manned terrestrial vehicle, an unmanned terrestrial vehicle, a surface water borne vehicle, a subsurface water borne vehicle, a hovercraft, and combinations thereof.

The features, functions and advantages that have been discussed can be achieved independently in various aspects or may be combined in other aspects, further details of which can be seen with reference to the following description and the drawings.

BRIEF DESCRIPTION OF THE DRAWINGS

Figure 1:
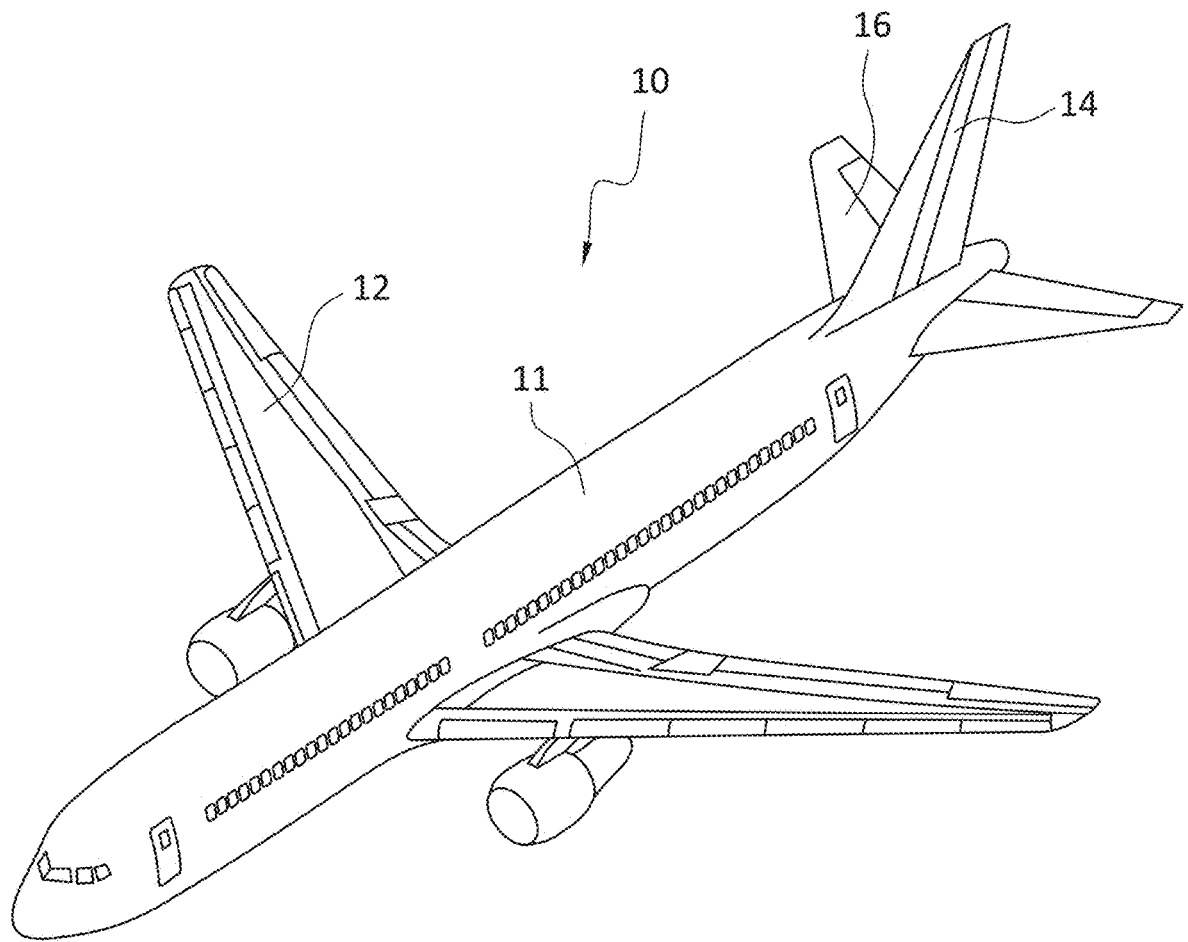
Figure 1A:
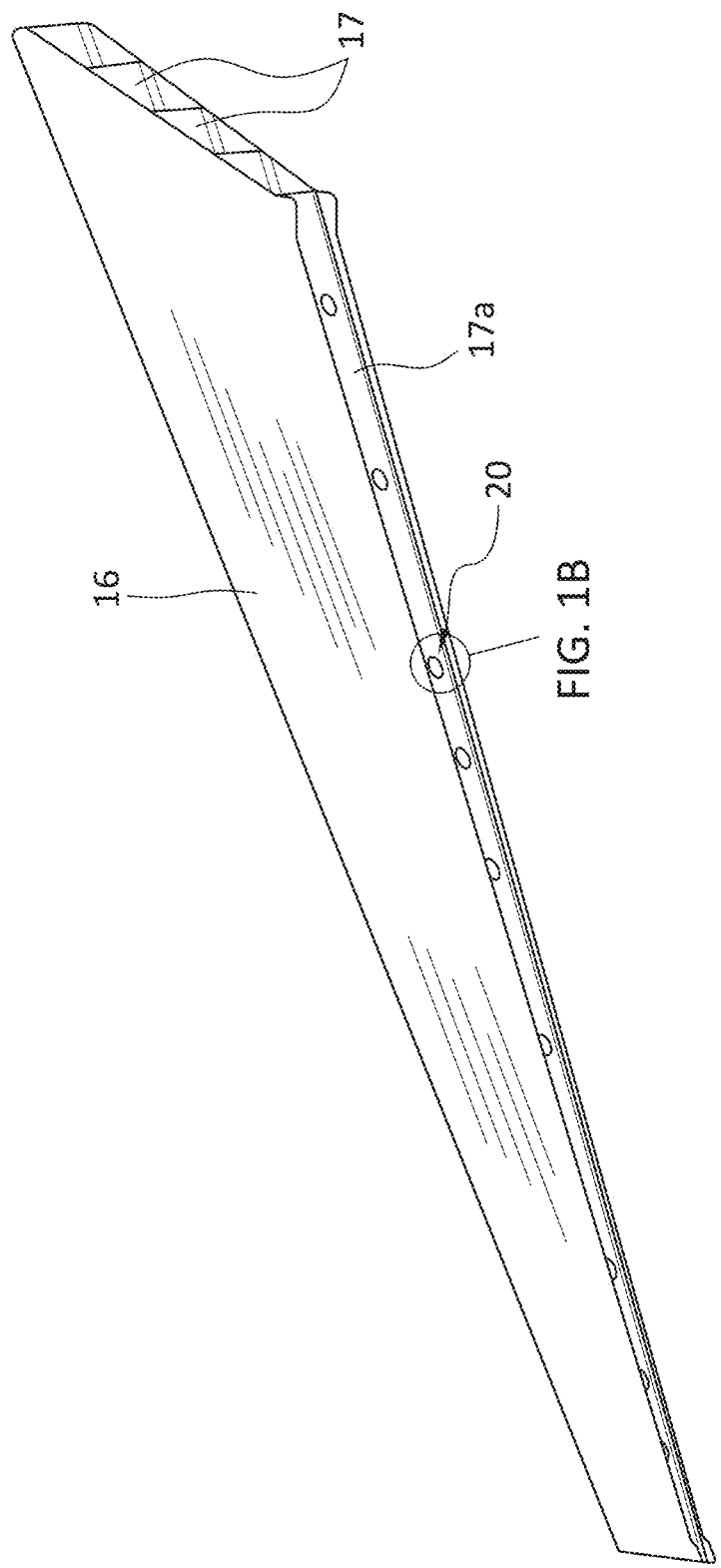
Figure 1B:
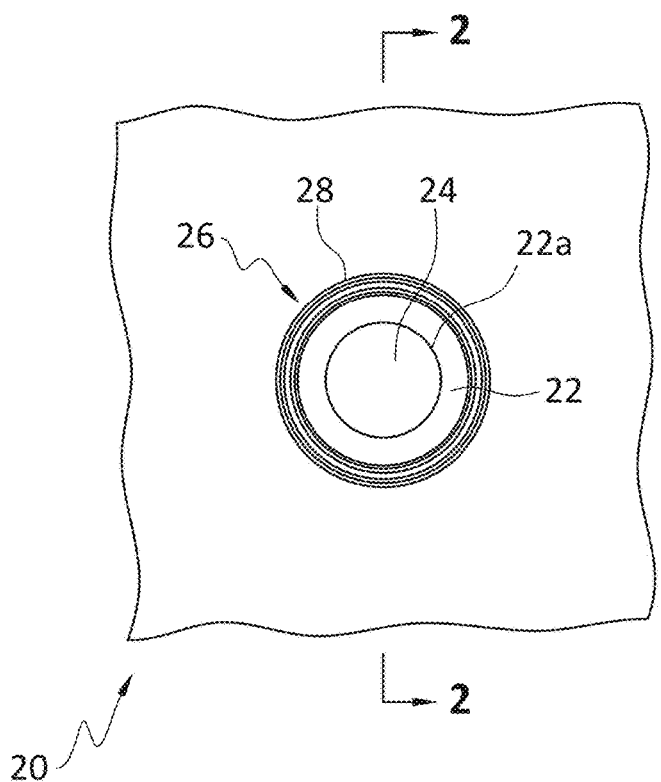
Figure 2:
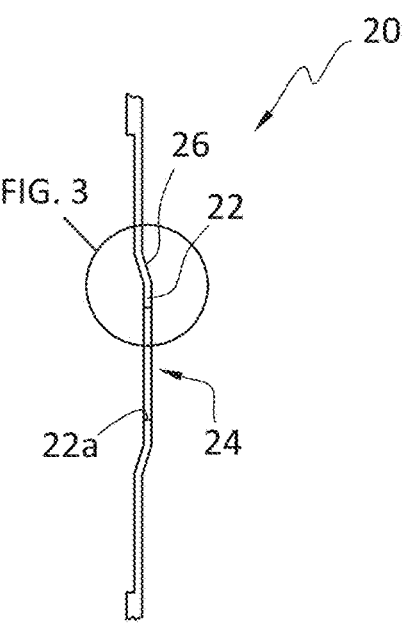
Figure 3:
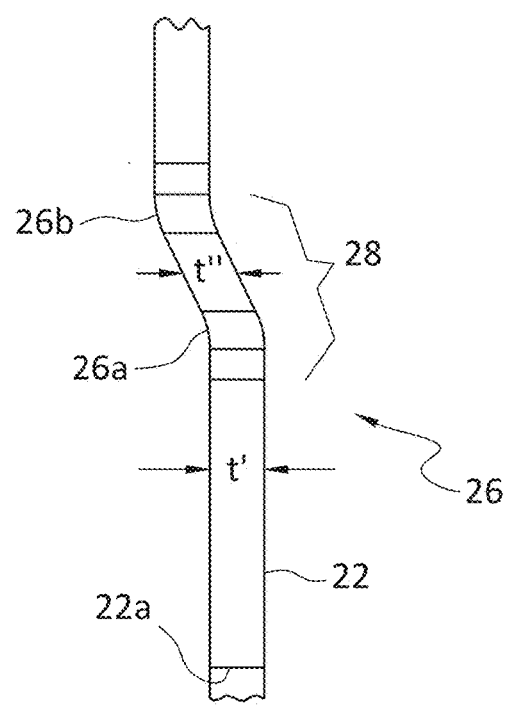
Figure 4A:
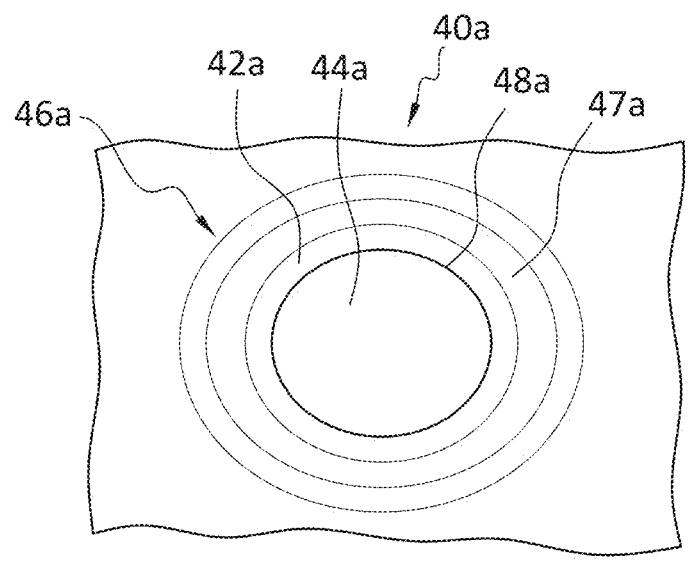
Figure 4B:
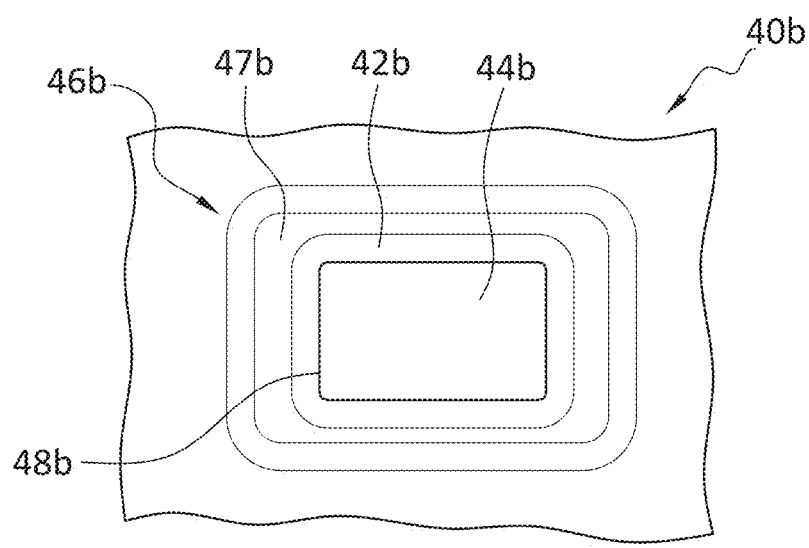
Figure 4C:
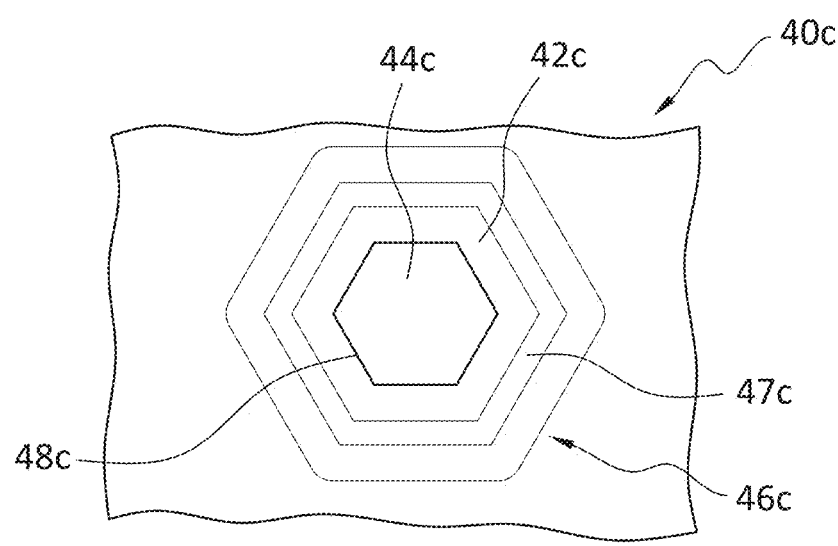
Figure 5A:
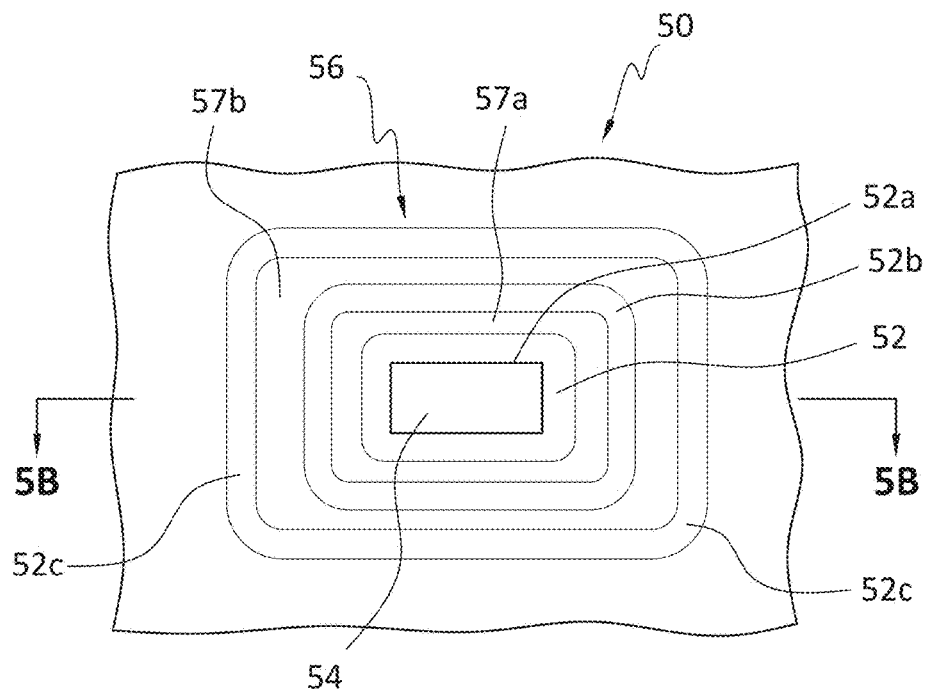
Figure 5B:
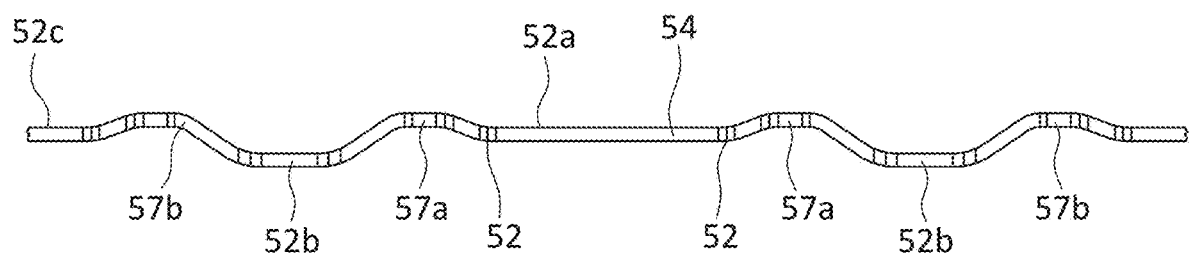
Figure 7A:
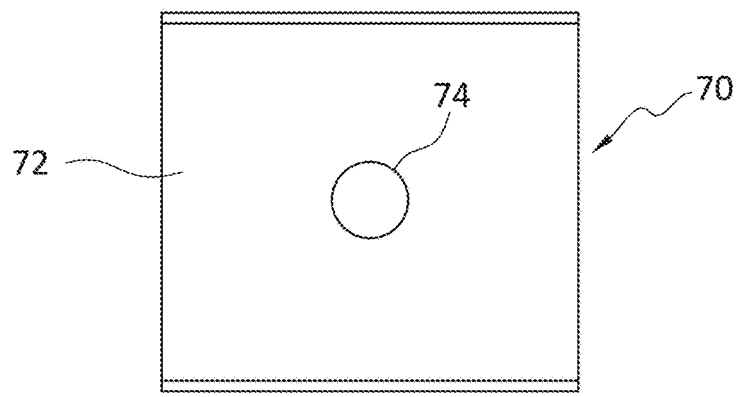
Figure 7B:
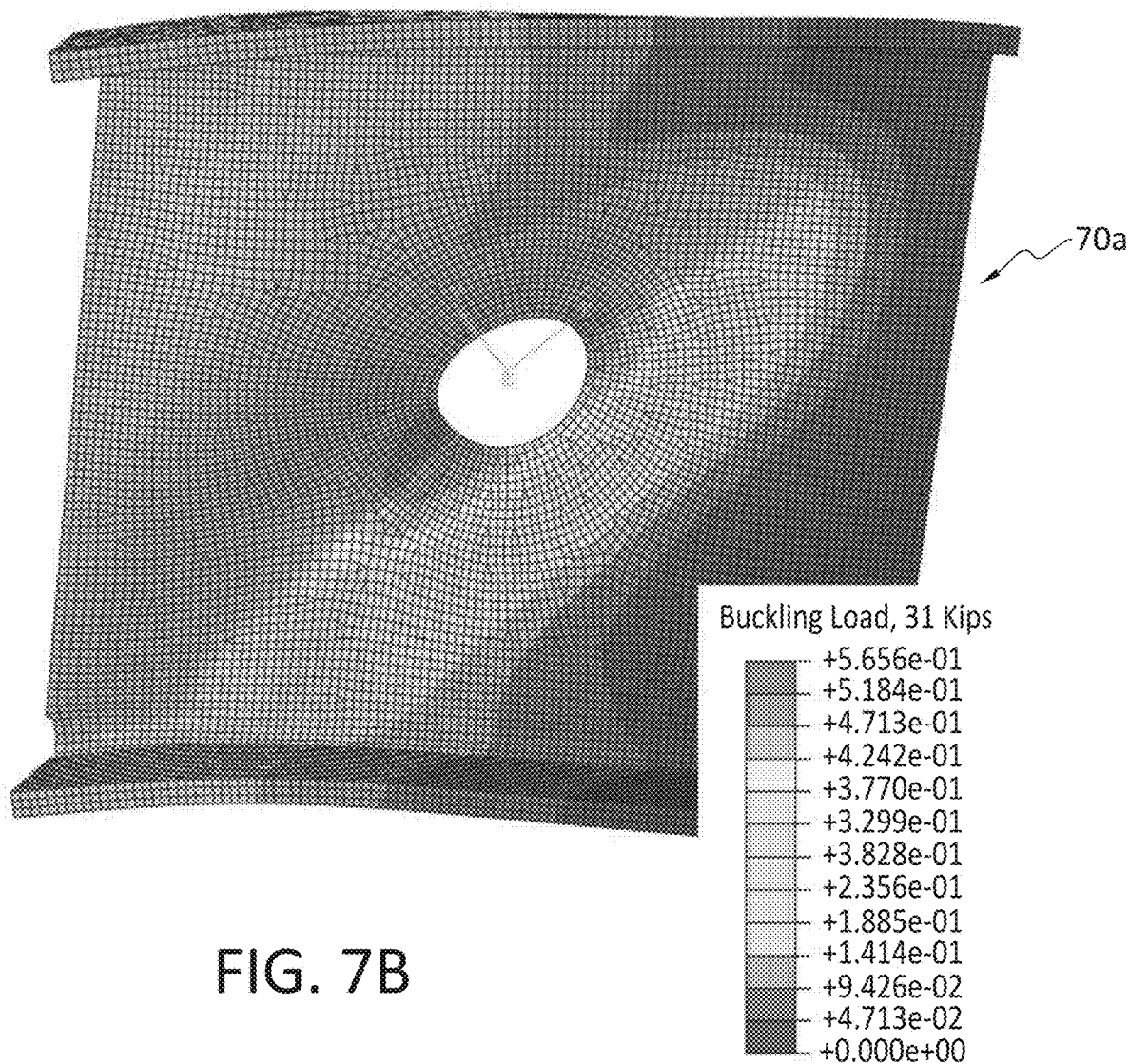
Figure 7C:
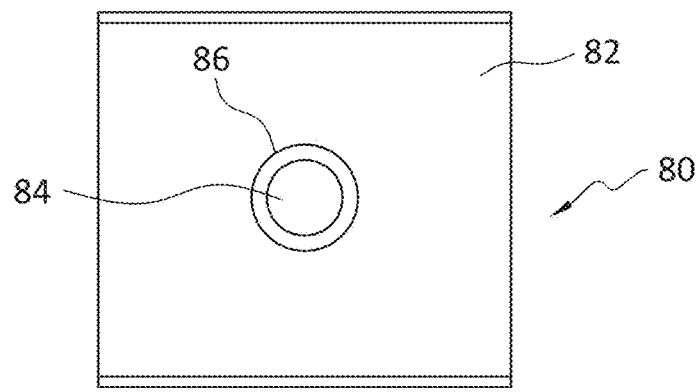
Figure 7D:
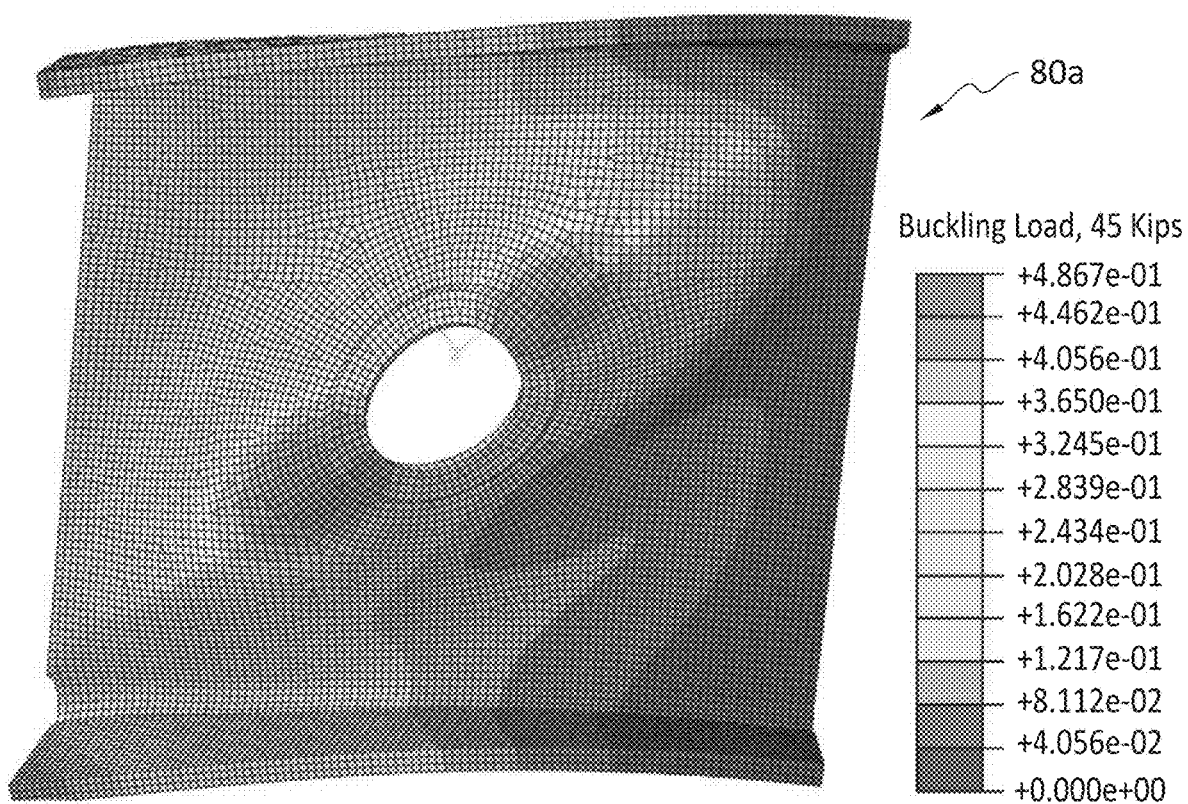
Figure 8A:
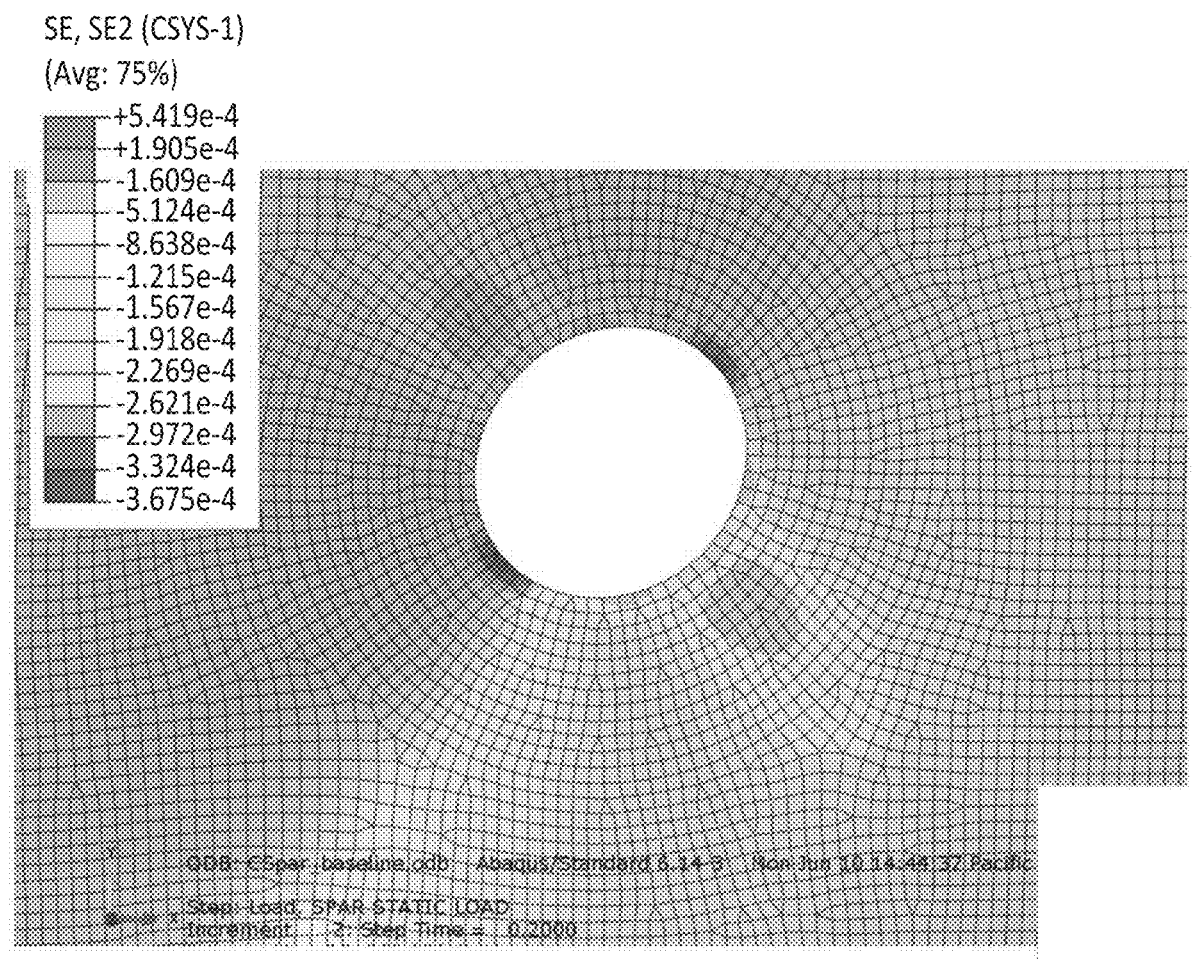
Figure 8B:
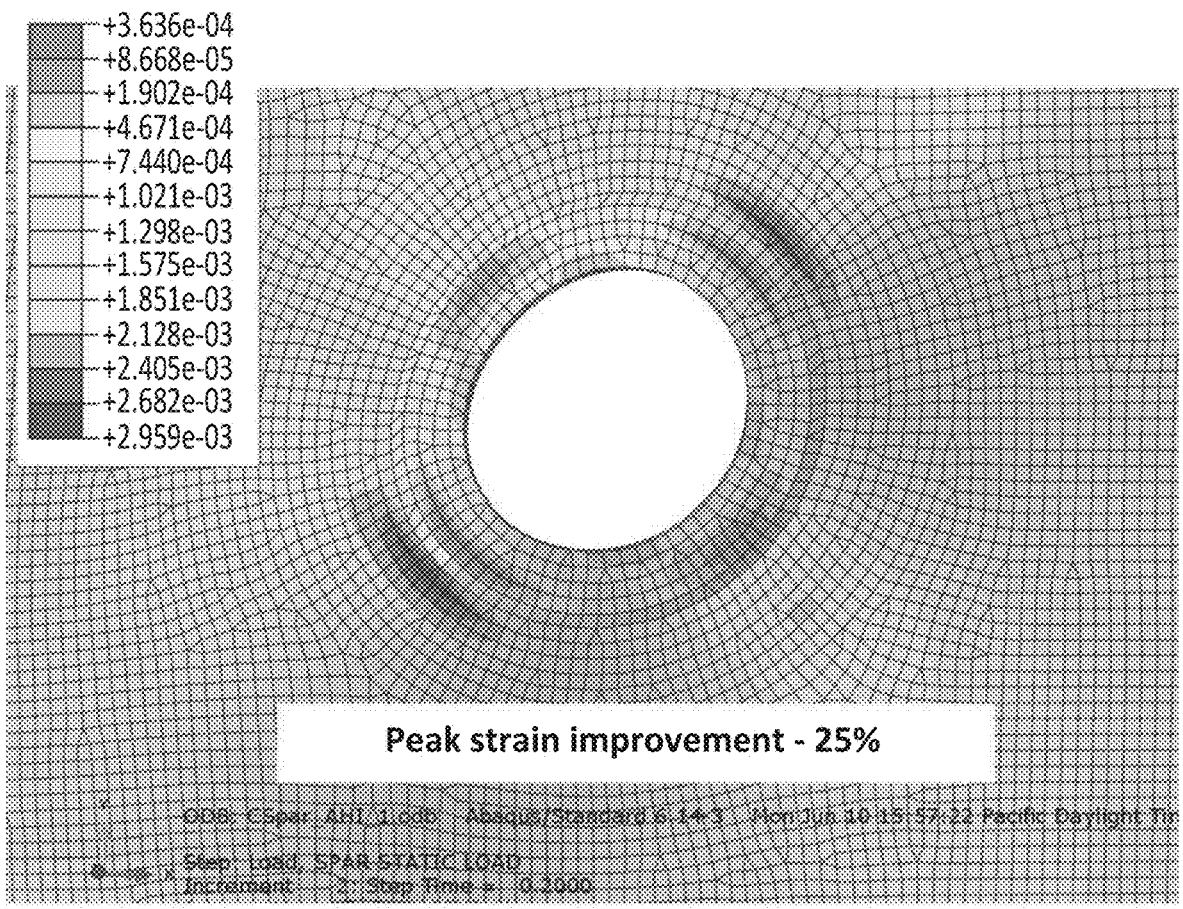
Figure 9:
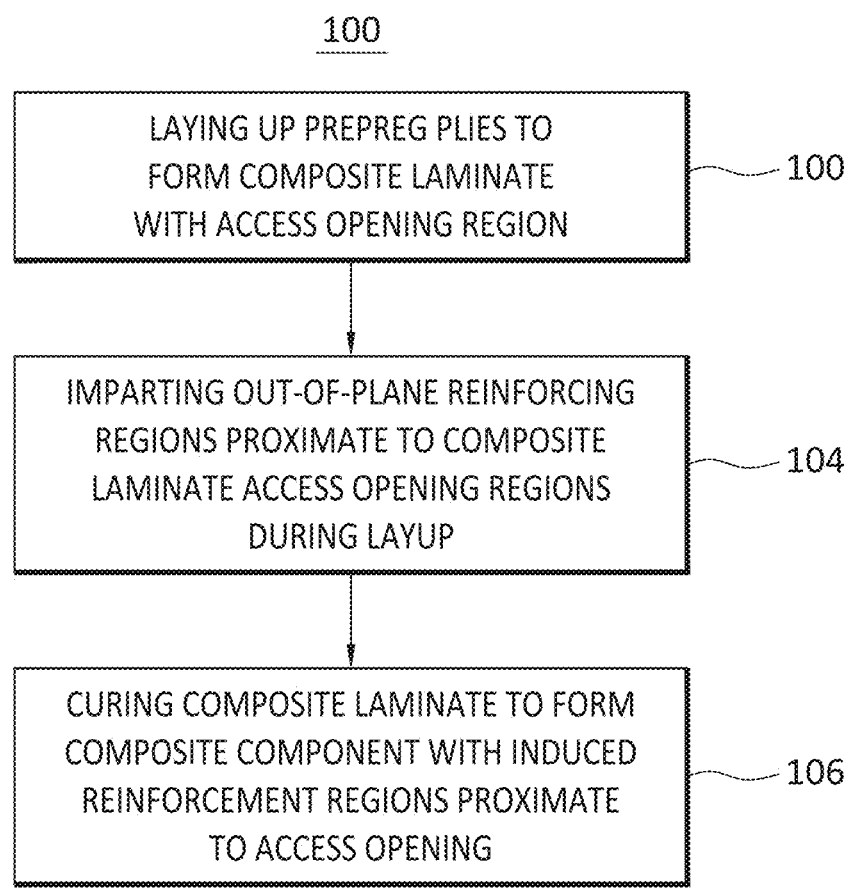

Having thus described variations of the disclosure in general terms, reference will now be made to the accompanying drawings, which are not necessarily drawn to scale, and wherein:

FIG. 1 is an illustration of a vehicle in the form of an aircraft, according to present aspects;

FIG. 1A is an illustration of an airfoil that includes an access opening in a C-channel spar component that can be subject to high shear loads that can induce peak strains at the edge of the access hole, according to present aspects;

FIG. 1B is an enlarged view of illustrating a section of a C-channel spar showing an access opening, according to present aspects;

FIG. 2 is an illustration of a cross-sectional view of the component shown in FIG. 1B, according to present aspects;

FIG. 3 is an illustration of an enlarged cross-sectional view of the component shown in FIG. 2, according to present aspects;

FIG. 4A is an illustration of a plan view of a component comprising an induced reinforcement having a predetermined geometry, according to present aspects;

FIG. 4B is an illustration of a plan view of a component comprising an induced reinforcement having a predetermined geometry, according to present aspects;

FIG. 4C is an illustration of a plan view of a component comprising an induced reinforcement having a predetermined geometry, according to present aspects;

FIG. 5A is an illustration of a plan view of a component comprising present aspects;

FIG. 5B is an illustration of a cross-sectional view the components shown in FIG. 5A, taken along "line 5B", according to present aspects;

FIG. 6A is an illustration of a plan view of a component comprising present aspects;

FIG. 6B is an illustration of a cross-sectional view the components shown in FIG. 6A, taken along "line 6B", according to present aspects;

FIG. 7A is an illustration of a plan view of a composite component control test sample (e.g., in the form of a conventional C-channel spar) that does not have the induced reinforcement (and in contrast to present aspects);

FIG. 7B is a representation of a readout illustrating out-of-plane deflection of web incurred by the composite component control test sample (e.g., in the form of a conventional C-channel spar) under cantilever beam bending condition as shown in FIG. 7A (and in contrast to present aspects);

FIG. 7C is an illustration of a plan view of a component according to present aspects;

FIG. 7D is a representation of a readout illustrating improvement to buckling load incurred by the component as shown in FIG. 7C, according to present aspects;

FIG. 8A is a representation of a readout illustrating a strain incurred by a composite component control test sample (e.g., in the form of a conventional C-channel spar) in a pre-buckled state (that does not include the induced reinforcement present according to present aspects);

FIG. 8B is a representation of a readout illustrating a reduced strain incurred by the component as compared to the component shown in FIG. 8A at a same applied load in a pre-buckled state where strain magnitude is reduced by approximately 25% due to the present aspects;

FIG. 9 is a flowchart outlining a method according to a present aspect; and

Figure 10:
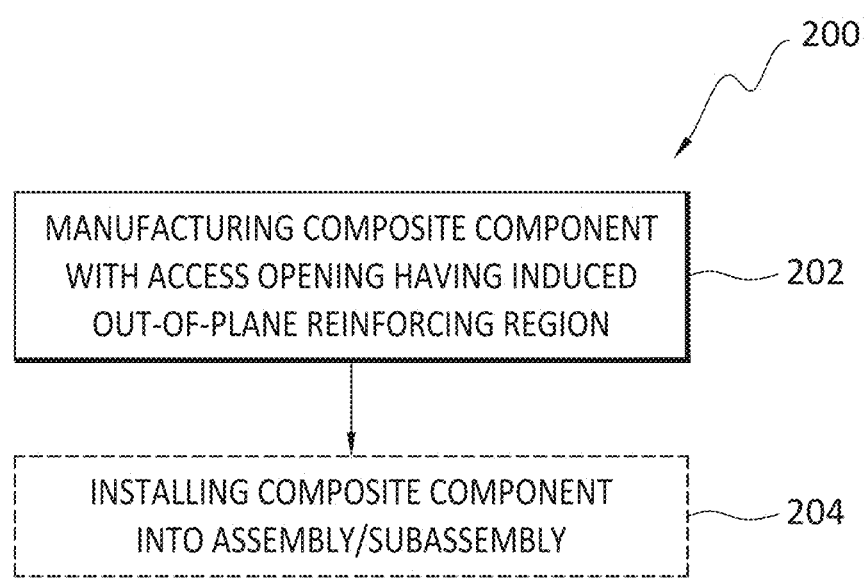

FIG. 10 is a flowchart outlining a method according to a present aspect.

DETAILED DESCRIPTION

Structural composite components that have an area on the component that is coincident with locations that can exhibit high peak strain during use can impact the structural performance of such components, as well as lead to the need for replacing, reworking, increasing the frequency of inspection regimens, etc., of such structural composite components. According to present aspects, composite components (e.g., components made from composite materials) are structurally reinforced to withstand high peak strain levels by, among other factors, interrupting the strain load that would otherwise normally occur, without adding additional weight to the component, or otherwise providing augmented material layering at a reinforcement region.

FIG. 1 is a non-limiting illustration of a vehicle in the form of an aircraft incorporating composite components according to present aspects, As shown in FIG. 1, vehicle/aircraft 10 includes a fuselage 11, wings 12 and a tail section including a vertical stabilizer 14 and horizontal stabilizer 16.

FIG. 1A is an enlarged and a partially exposed view of a horizontal stabilizer 16 acting as an airfoil for the illustrated aircraft. Horizontal stabilizer 16 includes internally located C-channel spars 17 with a rear spar 17a located longitudinally along the rear edge of the horizontal stabilizer 16. FIG. 1B is an enlarged view of the rear spar 17a showing a composite component (e.g., made from a composite material) in the form of a C-channel spar web 20. As shown in FIG. 1B, the C-channel spar web 20 includes a spar web planar section 22 with spar web planar section edge 22a forming a perimeter encircling a spar web access opening 24, with the spar web access opening 24 extending through the thickness (t', as shown in FIG. 3) of the spar web access opening 24. FIG. 1B further shows an induced reinforcing region 26 that includes at least one geometric zone 28 surrounding the access opening 24.

The composite components manufactured with the reinforcing features and reinforcing regions according to present aspects can be composite components that are manufactured to include an access opening, with the composite component made from thermoplastic polymer composite material and thermoset polymer composite materials. Further, according to present aspects, composite components of many types can be reinforced using presently disclosed methods and by imparting or inducing the presently disclosed reinforcing regions. Composite components having integrated access openings machined into, or otherwise formed into their structure find utility integrating present aspects, as such composite components, during their component lifetime in use, can bear unique strain loads when they are incorporated into larger structures, sub-assemblies, assemblies, etc., as load bearing components are joined to or pass through the access openings of the presently contemplated composite components having access openings.

FIG. 2 is an illustration showing an enlarged cross-sectional side view of a section of the spar web 20 shown in FIG. 1B and taken across line 2-2 as shown in FIG. 1B. As shown in FIG. 2, the spar web planar section 22 includes spar web planar section edge 22a that forms a perimeter that encircles a spar web access opening 24. FIG. 2 further shows induced reinforcing region 26 of the spar web.

FIG. 3 is an illustration showing a further enlarged cross-sectional side view of the spar web 20 shown in FIGS. 1B and 2 and taken across line 2-2 as shown in FIG. 1B. As shown in FIG. 3, the spar web planar section 22 includes spar web planar section edge 22a that forms a perimeter that encircles a spar web access opening 24. FIG. 3 shows, in further detail, reinforcing region 26 of the spar web. As shown in FIG. 3, reinforcing region 26 includes a geometric zone 28 that deviates from, or is "out-of-plane" with, spar web planar section 22. FIG. 3 further shows that reinforcing region 26 includes first angle deviation point 26a in the geometric zone 28 where a first angular deviation occurs from the planar (180 degree) orientation of the spar web planar section 22. As also shown in FIG. 3, reinforcing region 26 further show a second angle deviation point 26b where a second angular deviation occurs; the second angular deviation shown as deviating from the plane of the geometric zone 28 in the reinforcing region 26 (that is out-of-plane with the spar web planar section 22).

As shown in FIG. 3, the portion of the spar web shown in FIG. 3 at second angle deviation point 26b can "correct" the first angular deviation from a planar orientation of the spar web planar section. For example, combining the angles at first and second angle deviation points, 26a, 26b respectively, the angular deviation of the geometric zone 28 in the reinforcing region 26 from the spar web planar section 22 at first angle deviation point 26a, is "countered" or "returned to an initial planar orientation, such that the combined value of angles at first and second angle deviation points 26a and 26b totals about 180 degrees.

Though not shown, present aspects further contemplate second angle deviation point 16b representing an angle of deviation that, when combined with the angular deviation represented at angle deviation point 26a does not equal 180 degrees, and therefore does not return the plane angle outside of the reinforcing region precisely to a plane angle equal to the plane of the spar web planar section 22, as dictated by various component design configurations.

Though not shown, present aspects further contemplate additional angle deviation points (more than the two angle deviation points 26a, 26b shown in FIG. 3) being introduced into a composite component, if desired. That is, the reinforcing region that includes the geometric zones, and that is located proximate to and at a predetermined distance from an access opening in a composite component can include one or more geometric zones, with one or more geometric perimeters present within a given geometric zone (e.g., a number to include, for example, 1, 2, 3, 4, 5, 6, 7, 8 or more, etc., geometric perimeters within a given geometric zone, etc.) with each geometric zone including the same or different geometric shapes, (with the term "geometric shapes" referred to equivalently herein as "geometries"), including, for example, regular geometries including circles, squares, rectangles, hexagons, trapezoids, rhombuses, ellipses, etc., and/or irregular geometries and/or irregular patterns.

In addition, the height of the geometric zone(s) in the reinforcing region (e.g., the distance from a planar surface of the composite component occurring at the "base" of a geometric zone surface to the top surface of the geometric zone of the reinforcing region) and the angle of deviation from the planar surface, and the slope, and the slope changes in the geometric zone of the reinforcement region can be tailored, for example, to yield an improved predetermined effect in the resulting composite components in terms of buckling resistance, damage resistance, strain pattern dissipation, strain pattern interruption, interruption of load path, increase in out-of-plane stiffness, etc. Again, the improved out-of-plane stiffness and other properties imparted to the composite components through the benefit of the presently disclosed aspects are achieved without adding weight to the composite component, as no additional material is deposited at the reinforcing regions prior to, during or after the manufacture (e.g., the laying up and curing) of the composite components.

The out-of-plane features and regions that are introduced into the layed up composite laminate by the layup tool are induced areas of "relief" as compared to the planar regions in the layed up composite laminate. Such "relief" features that deviate from the plane of the majority of the planar surface can also be referred to as joggles. The induced joggles have a predetermined geometry and dimension with predetermined step height and ramp. According to present aspects, the dimension and geometry of the induced relief areas, or joggles, can be tailored to achieve a desired reinforcing result in terms of advantageous buckling load increases, strain pattern interruption, etc., without adding additional prepreg segments or buildup at the reinforcing regions of relief (joggles). As a result the weight of the cured composite component made from the cured composite laminate does not increase, even though the composite component has been significantly reinforced and strengthened in the region of the access opening and throughout the composite component, as the strain patterns are interrupted and strain loads and buckling loads are significantly increased.

The induced out-of-plane reinforcing joggles can include directional or angular deviation from the general plane of the composite component by about +/−45 degrees. In addition, smaller angles ranging from about +/−25 degrees to about +/−75 degrees can accomplish predetermined amounts of reinforcing improvement, especially if a plurality of joggles are induced as a continuous or discontinuous perimeter or series of "ringed perimeters" induced proximate to the access opening and substantially surrounding the access opening.

According to present aspects, the step height of a joggle (e.g., the height or distance of a joggle away from the planar surface of a component) can impact the reinforcing impact observed by the composite component in the area of the access opening and across the area of the composite component. According to present aspects, step heights of the out-of-plane reinforcement features, or joggles, can be tailored to deliver a predetermined increase in the composite component strength properties in terms of buckling load increases and strain load/pattern interruption. Present aspects contemplate a step height of joggle ranging from about 0.5 times to about 1.5 times the composite component laminate thickness.

Regarding the various geometries of the reinforcing region presently contemplated, according to present aspects, FIGS. 4A, 4B, and 4C show non-limiting geometric options for the shapes of the geometric perimeters of the reinforcing regions and the number of geometric perimeters induced into the composite component within a reinforcing region. For example, FIG. 4A shows an overhead plan view of a composite component 40a that can be, for example a spar web, or other composite component having an access opening that is circular in shape. Composite component 40a includes a composite component planar section 42a with composite component planar section edge 48a forming a circular perimeter that surround a circular composite component access opening 44a. FIG. 4A shows, in further detail, reinforcing region 46a of the composite component 40a. As shown in FIG. 4A, reinforcing region 46a includes a geometric zone 47a that deviates from, or is "out-of-plane" with composite component planar section 42a.

In another example of a contemplated geometric perimeter shape, FIG. 4B shows an overhead plan view of a composite component 40b that can be, for example a spar web, or other composite component having an access opening that is rectangular in shape. Composite component 40b includes a composite component planar section 42b with composite component planar section edge 48b forming a rectangular perimeter that surround a rectangular composite component access opening 44a. FIG. 4B shows, in further detail, reinforcing region 46b of the composite component 40b. As shown in FIG. 4B, reinforcing region 46b includes a geometric zone 47b that deviates from, or is "out-of-plane" with composite component planar section 42b.

In another example of a contemplated geometric perimeter shape, FIG. 4C shows an overhead plan view of a composite component 40c that can be, for example a spar web, or other composite component having an access opening that is hexagonal in shape. Composite component 40c includes a composite component planar section 42c with composite component planar section edge 48c forming a hexagonal perimeter that surrounds a hexagonal composite component access opening 44c. FIG. 4C shows, in further detail, reinforcing region 46c of the composite component 40c. As shown in FIG. 4C, reinforcing region 46c includes a geometric zone 47c that deviates from, or is "out-of-plane" with composite component planar section 42c.

As mentioned above, according to present aspects, a reinforcing region can include multiple geometric perimeters. FIG. 5A is a non-limiting illustration according to further present aspects. FIG. 5A shows an overhead plan view of a composite component 50 that can be, for example a spar web, or other composite component having an access opening 54 that is rectangular in shape. Composite component 50 includes composite component planar sections 52, 52b, and 52c. Composite component planar section edge 52a forms a rectangular perimeter that surrounds a composite component access opening 54 that appears rectangular in shape. FIG. 5A, shows in further detail, reinforcing region 56 of the composite component 50. As shown in FIG. 5A, reinforcing region 56 includes first geometric zone 57a and second geometric zone 57b that deviate from, or are "out-of-plane" with, composite component planar sections that exist adjacent to the composite component access opening 54. Additional composite material planar sections 52b, 52c (located at increasing distances from the access opening 54) are shown oriented "outside of" the periphery of the first and second geometric zones 57a and 57b, respectively, of the reinforcing region 56.

FIG. 5B is an enlarged cross-sectional side view of the composite component shown in FIG. 5A taken along line 5B-5B. As shown in FIG. 5B, the centrally located composite component access opening 54 is surrounded by the composite component planar section edge 52a that adjoins composite component planar section 52. Moving outwardly in both directions (from the composite component planar section 52) the first geometric zone 57a is shown as a raised region (and is shown in FIG. 5A as a rectangular "ring"). Moving outwardly, the first geometric zone adjoins a composite component planar section 52b that, in turn adjoins the second geometric zone 57b again shown as a raised region (and that is shown in FIG. 5A as a larger rectangular "ring"), which, in turn adjoins an outermost composite component planar section 52c that also can represent the outermost region (equivalently referred to herein as the "outer periphery", or "outer perimeter") of the reinforcing region 56.

According to present aspects, composite components used in the formation of the exterior of a larger structure can further require attention paid to aspects that can include the impact of a composite component in maintaining a desired outer mold line (OML). For example, in an aircraft, doors, covers, etc. fit into or "mate" flush with access openings to maintain a desired OML, according to predetermined aircraft design specifications, whereas the door, cover, etc., may be mechanically attached or permanently bonded with adhesive to the mating surface of the present aspect. Present aspects facilitate the establishment and maintenance of predetermined design specifications to achieve and maintain a predetermined OML.

FIGS. 6A and 6B are non-limiting illustrations of an exterior composite component for an aircraft illustrating the establishment and maintenance of an OML. As shown in FIG. 6A, a composite component is the form of an exterior composite skin component 60 having a composite skin component exterior 60a, a composite skin component interior 60b, and a composite skin component planar section 62. The exterior composite skin component 60 further includes a composite skin component planar section edge 62a, and shown in FIG. 6A forming a perimeter encircling an exterior composite skin component access opening 64, with the exterior composite skin component access opening 64 extending through the exterior composite skin component 60. FIG. 6A further shows an induced reinforcing region 66 that includes at least one geometric out-of-plane perimeter 68 surrounding the exterior composite skin component access opening 64 generally (at a predetermined distance from the access opening 64), and surrounding the exterior composite skin component planar section 62 specifically.

FIG. 6B is an illustration showing an enlarged cross-sectional side view of the composite component in the form of the exterior composite skin component 60 shown in FIG.

6A taken across line 6A-6A shown in FIG. 6A. FIG. 6B shows the exterior composite skin component planar section 62 with an exterior composite skin component planar section edge 62a forming a perimeter encircling an access opening 64, with the access opening 64 extending through the exterior composite skin component 60. FIG. 6B further shows an induced reinforcing region 66 that includes at least one geometric out-of-plane perimeter 68 surrounding the access opening 64 generally (at a predetermined distance from the access opening and) and surrounding the exterior composite skin component planar section 62 specifically. As shown in FIG. 6B, a cover in the form of an exterior access door 69 that includes an exterior access door exterior 69a and an exterior access door interior 69b is shown in place adjacent to the access opening 64. Exterior access door 69, as shown, can seal the access opening 64 and establish an intimate "fit" and orientation in combination with the exterior composite skin component 60 such that the exterior access door exterior 69a in combination with the skin component exterior 60a establishes and maintains a predetermined outer mold line (OML) at least for the purpose of maintaining a predetermined aerodynamic surface. Exterior access door 69, as shown, may be mechanically attached with fasteners; likewise, access door may be bonded (e.g., adhesively bonded, etc.) to the mating surface of the present aspect, exterior composite skin component planar section 62 and induced reinforcing region induced reinforcing region 66, using adhesive or similar moldable material.

Engineering developed shear testing was conducted and validated by Finite Element Method (FEM) analysis to introduce in-plane shear strain by applying tension load in opposite corners of tested components. Comparative testing was conducted to determine the impact of the induced reinforcing regions manufactured into composite components. Baseline buckling load values were obtained by testing a composite component that does not include the presently disclosed induced reinforcement regions, and then comparing the buckling load values obtained for composite components, according to present aspects, having induced reinforcement regions incorporated. The engineering developed testing was conducted on carbon fiber reinforced epoxy thermoset laminate composite materials.

FIG. 7A shows, as a "control", a composite component test sample 70 (in the form of a C-channel spar) having in-plane surfaces 72 and an access opening 74 and without the presence of a reinforcement region according to present aspects. Engineering developed buckling load analysis was conducted and validated by Finite Element Method (FEM) analysis to introduce in-plane shear strain by applying tension load in opposite corners of analyzed components. A readout of the buckling forces across the area of the composite component test sample 70 was generated.

FIG. 7B shows a readout 70a of the buckling load analysis conducted for composite component test sample 70 showing the magnitude of buckling forces in the FIG. 7B key (in the inset) under a cantilever beam bending condition. As shown in FIG. 7B the highest buckling load regions 78 appear at the access opening perimeter indicating a resistance level for buckling (an out-of-plane stiffness value), beyond which the composite component is said to "fail" at a recorded bucking load value of 31 kips (1 kip, or kilopound 4448.2216 N 4.4482216 kN).

In contrast to the results obtained and presented as shown in FIG. 7B (e.g., for a composite component control test sample e.g., in the form of a conventional C-channel spar), engineering developed buckling load analysis was conducted and validated by Finite Element Method (FEM) analysis to introduce in-plane shear strain by applying tension load in opposite corners of tested components that included the induced reinforcement regions proximate to the access opening, and according to present aspects. FIG. 7C shows a composite component 80 in the form of a C-channel spar, having in-plane surfaces 82, an access opening 84 and an induced reinforcement region 86 with reinforcement region 86, according to present aspects.

FIG. 7D is a readout of the buckling force analysis conducted for composite component 80 that included the reinforcing regions according to present aspects, with the predicted buckling load readout showing a buckling load force magnitude of 45 kips, (shown in the FIG. 7D key), representing a 45% improvement in buckling load resistance as compared to the buckling load resistance of composite component test sample 70 (the control sample).

The induced reinforcement regions according to present aspects, results in superior control of buckling behavior. FIG. 7B demonstrates typical web buckling shape resulting in composite component test sample 70 that does not include the reinforcement regions. By introducing the reinforcement regions in predetermined orientations, and according to present aspects, FIG. 7D demonstrates a buckling shape that reversed. That is, the induced reinforcement regions force the C-channel spar section to buckle "against" the natural buckling tendency of the C-channel section, resulting in a buckling load improvement of about 45%, and further resulting in an increased capability of a post-buckled structure.

As shown in FIG. 7D the epicenter of the highest buckling load regions 88 did not occur at the access opening perimeter. Instead, as shown in readout 80a, the epicenter of the highest strain/buckling force was relocated or otherwise dispersed away from the perimeter of the access opening to a location on composite component test sample 80, with a recorded buckling load value of 45 kips. In other words, analysis demonstrated that the composite component sample 80 that incorporated the induced reinforcement region proximate to the access opening, and according to present aspects, realized a 45% improvement in buckling load, as well as an improved realized change in overall buckling shape (as compared to the sample 70 that did not incorporate the induced reinforcement region proximate to the access opening).

Baseline peak strain values were obtained from a Finite Element Analysis (FEA) on a composite component that does not include the presently disclosed induced reinforcement regions, and then comparing the peak strain values for composite components having induced reinforcement regions incorporated using the same FEA analysis approach, according to present aspects, having induced reinforcement regions incorporated.

FIG. 8A shows a readout of the peak strain testing conducted for the composite component test sample 70 (shown in FIG. 7A; the control composite component without the reinforcement regions) showing the magnitude of peak strain in the FIG. 8A key (in the inset). As shown in FIG. 8A the highest peak strain values at the access opening perimeter indicate a recorded peak strain level, beyond which the composite component is said to "fail".

FIG. 8B is a representation of a readout illustrating a reduced strain incurred over the same load for a composite component 80 having the induced reinforcement regions according to present aspect as compared to the composite component test sample 70 as shown in FIG. 8A. The same load was applied to the composite component test sample 70 (results shown in FIG. 8A) and the composite component 80 including reinforcement regions (results shown in FIG. 8B). The strain magnitude of the composite component 80 that includes the induced reinforcement regions showed strain reduction in a pre-buckled state of approximately 25% as compared to the analyzed composite component test sample 70 (shown in FIG. 8A) that did not include the induced reinforcement regions.

FIG. 8B illustrates a readout of the peak strain analysis conducted for composite component 80 comprising the reinforcing regions according to present aspects, with the recorded peak strain values shown in the FIG. 8B key. As shown in FIG. 8B the epicenter of the highest peak strain regions did not occur at the access opening perimeter. Instead, as shown in the readout shown in FIG. 8B, the epicenter of the highest peak strain force for sample 80 (shown in FIG. 7C; the sample with the reinforcing regions, and according to present aspects) was lower by at least about 25% than the peak strain value recorded for the composite component test sample 70. In addition, as shown in FIG. 8B, the peak strain was relocated, or otherwise dispersed away, from the perimeter of the access opening and was decentralized, or broken into multiple areas of peak strain (rather than the concentration of peak strain that is shown in FIG. 8A for composite component test sample 70). Regarding peak strain values obtained, as shown in the key in FIG. 8B, the peak strain observed in the composite component incorporating the reinforcement region, according to present aspects, was approximately 25% lower than the peak strain values obtained for the composite component test sample 70 (without the reinforcing regions), and shown in the key attending FIG. 8A. The decentralization or "breaking up" of the peak strains observed in the readout shown in FIG. 8B and the reduction in peak strain observed in the composite component 80 (incorporating the reinforcing region) also improved post-buckled structure capability.

FIGS. 9 and 10 are flowcharts outlining methods according to present aspects. As shown in FIG. 9, a method 100 for manufacturing reinforced composite components according to present aspects is outlined, with the method 100 including laying up 102 prepreg plies of composite material to form a composite laminate, with the composite material having access openings, or with the composite material prepared for machining to create an access opening. The method 100 further includes imparting 104 out-of-plane reinforcing regions proximate to the composite laminate access opening regions during layup, followed by curing 106 the composite laminate to form a composite component with induced reinforcement regions proximate to the access opening.

FIG. 10 illustrates a method 200 for manufacturing and installing the presently disclosed composite components according to present aspect with the method 200 including manufacturing 202 a composite component having an access opening, and with the composite component having induced out-of-plane reinforcing regions locate proximate to the access opening. Method 200 optionally includes installing 204 the composite component having induced out-of-plane reinforcing regions locate proximate to the access opening into at least one of: a larger structure, an assembly, and a sub-assembly. The installing 204 step can optionally include installing the composite component having induced out-of-plane reinforcing regions by at least one of: mechanical fasteners and adhesive bonding. The methods set forth above and the methods outlined in FIGS. 9 and 10 can implement the reinforced composite components having the reinforcing regions located proximate to access openings in the composite component as disclosed herein, and according to present aspects, and as shown in any of FIGS. 1, 1A, 1B, 2, 3, 4A, 4B, 4C 5A, 5B, 6A, 6B and 7C.

The out-of-plane geometric zones induced in the induced reinforcement regions of composite components can be continuous or can be discontinuous; with the geometric pattern (e.g., circle, square, rectangle, hexagon, etc.) "broken", interrupted, or otherwise perceived to be discontinuous while also imparting advantageous out-of-plane stiffening increases, and other advantageous composite material property and material performance improvements (e.g., when the composite component is placed under strain loads, etc.). That is, present aspects include geometric zones in the reinforcement regions that can be discontinuous with substantially all sections of the geometric zones being out-of-plane relative to the planar composite component According to the present disclosure, substantially all sections of the geometric zones being out-of-plane means that up to 10% of the geometric zone can have be planar, or otherwise not be out-of-plane.

Ductile materials, including certain metals can be subjected to various "post-fabrication" reinforcing and strengthening regimens including, for example, welding, brazing, stamping, etc. In contrast to more ductile materials, the post-fabrication properties of cured composite materials, including thermoplastic and thermoset polymeric composite materials that exhibit high strength and low weight do not lend themselves to the post-processing reinforcing techniques used in materials including heavier metallic materials. Accordingly, as mentioned above, present aspects are directed to introducing reinforcement regions to composite materials having access openings during the composite prepreg layup stages composite material manufacturing.

Further, while methods for reinforcing composite materials have included the addition of prepreg ply layers to form "built up" reinforcement regions, such methods have required the addition of composite material layers, pre- or post-cure, to composite materials and such reinforced composite materials have not been achievable without producing a composite material having a significant weight increase as compared to the non-reinforced composite material (due to the additional weight of reinforcement laminated regions).

It was surprisingly found that forming out-of-plane reinforcing regions in layed-up laminates of composite material prepregs (prior to curing), and locating the out-of plane reinforcing regions proximate to where access openings will occur in a final cured composite component, significantly altered and significantly improved strain patterns in composite materials. The improved physical characteristics were achieved without adding weight, as no additional material was applied to or added to the reinforcing regions.

Though bound by no singular theory, it is now believed that lighter composite components having superior buckling resistance near access openings can be obtained by implementing presently disclosed aspects and inducing reinforcing regions while possibly reducing the overall thicknesses of composite material laminate layups that was previously required. Such a potential reduction in composite component thickness without sacrificing strength in terms of, for example, out-of-plane stiffness and buckling resistance, can potentially lead to even lighter weight composite components having equivalent strength by inducing the reinforcement regions set forth and described herein.

The presently disclosed aspects may, of course, be carried out in other ways than those specifically set forth herein without departing from essential characteristics of the present disclosure. The present aspects are to be considered in all respects as illustrative and not restrictive, and all changes coming within the meaning and equivalency range of the appended claims are intended to be embraced therein.

What is claimed is:

1. An apparatus comprising:
a structural composite component made from a composite material, said structural composite component comprising a structural composite component exposed first side and a structural composite component exposed second side, said structural composite component comprising a structural composite component thickness, said structural composite component further comprising:
a planar region adjacent to and substantially surrounding an access opening, said access opening extending through the composite component, said planar region comprising a planar region thickness;
an induced out-of-plane reinforcing region, said induced out-of-plane reinforcing region located a predetermined distance away from the access opening, and said induced out-of-plane reinforcing region comprising an out-of-plane geometric perimeter, said out-of-plane geometric perimeter surrounding the access opening, said out-of-plane geometric perimeter comprising an out-of-plane reinforcing region thickness;
wherein the planar region thickness, and the out-of-plane reinforcing region thickness are substantially equivalent to one another; and
wherein the out-of-plane reinforcing region does not comprise additional composite material buildup at the out-of-plane reinforcing region.

2. The apparatus of claim 1, wherein the induced out-of-plane reinforcing region comprises a reinforcing segment that is out-of-plane as compared to the planar region.

3. The apparatus of claim 1, wherein the induced out-of-plane reinforcing region increases a buckling load of the component.

4. The apparatus of claim 1, wherein the induced out-of-plane reinforcing region increases an out-of-plane stiffness of the component.

5. The apparatus of claim 1, wherein the induced out-of-plane reinforcing region counteracts a buckling force sustained by the component during use.

6. The apparatus of claim 1, wherein the induced out-of-plane reinforcing region increases a damage arrest capability of the component.

7. The component of claim 1, wherein the induced out-of-plane reinforcing region alters an in-plane strain pattern to a predetermined degree across the component.

8. The apparatus of claim 1, wherein the induced out-of-plane reinforcing region decreases a peak strain in the component.

9. The apparatus of claim 1, wherein the component is dimensioned to mate with an external cover, and wherein said external cover in combination with the component preserves an outer mold line.

10. The apparatus of claim 1, wherein the planar region thickness and the out-of-plane reinforcing region thickness both comprise an equivalent number of cured prepregs.

11. A structure comprising the apparatus of claim 1.

12. The structure of claim 11, wherein the planar region and the induced out-of-plane reinforcing region comprise an equivalent number of cured prepregs.

13. The structure of claim 11, wherein the structure comprises at least one of: a manned aircraft, an unmanned aircraft, a manned spacecraft, an unmanned spacecraft, a manned rotorcraft, an unmanned rotorcraft, a manned terrestrial vehicle, an unmanned terrestrial vehicle, a surface water borne vehicle, a subsurface water borne vehicle, a hovercraft, and combinations thereof.

14. A method comprising:
laying up a plurality of prepreg plies on a layup tool to form a structural composite component comprising a structural composite component exposed first side and a structural composite component exposed second side, said layup tool comprising a layup tool planar region and at least one layup tool out-of-plane feature;
imparting an out-of-plane region to the structural composite to form a structural composite component out-of-plane region in the structural composite component;
curing the structural composite component to form a cured structural composite component having a structural component thickness, said cured structural composite component comprising:
a structural composite component planar region adjacent to an
access opening, said access opening extending through the structural composite component, said structural composite component planar region comprising a planar region thickness;
a structural composite component induced out-of-plane reinforcing region, said structural composite component induced out-of-plane reinforcing region located a predetermined distance away from the access opening, and said structural composite component induced out-of-plane reinforcing region comprising an out-of-plane geometric perimeter, said out-of-plane geometric perimeter configured to surround the access opening, said induced out-of-plane reinforcing region comprising an induced out-of-plane reinforcing region thickness;
wherein the-structural composite component thickness, the planar region thickness, and the induced out-of-plane reinforcing region thickness are substantially equivalent to one another; and
wherein the out-of-plane reinforcing region does not comprise additional composite material buildup at the out-of-plane reinforcing region; and
wherein a total number of the plurality of prepreg plies applied to the layup tool planar region is equivalent to a total number of the plurality of prepreg plies applied to the layup tool out-of-plane region.

15. The method of claim 14, wherein the cured structural composite component comprises a thermoplastic polymeric material.

16. The method of claim 14, wherein the cured structural composite component comprises a thermoset polymeric material.

17. A method comprising:
manufacturing a structural composite component comprising a structural composite component exposed first side and a structural composite component exposed second side, said structural composite component comprising an access opening, said structural composite component further comprising;
a planar region proximate to the access opening; and
an induced out-of-plane reinforcing region, said induced out-of-plane reinforcing region located a predetermined distance away from the access opening, said induced out-of-plane reinforcing region comprising an out-of-plane geometric perimeter, said out-of-plane geometric perimeter surrounding the access opening at a predetermined distance from the access opening;
wherein the out-of-plane reinforcing region does not comprise additional composite material buildup at the out-of-plane reinforcing region.

18. The method of claim 17, wherein the induced out-of-plane reinforcing region alters a strain pattern to a predetermined degree throughout the structural composite component.

19. The method of claim 17, wherein the structural composite component comprises at least one of a thermoplastic polymeric material and a thermoset polymeric material.

20. The apparatus of claim 1, wherein the apparatus comprises an aircraft C-channel spar.

* * * * *